United States Patent [19]

Hollinger et al.

[11] Patent Number: 5,504,580
[45] Date of Patent: Apr. 2, 1996

[54] TUNED INTEGRATED OPTIC MODULATOR ON A FIBER OPTIC GYROSCOPE

[75] Inventors: Walter P. Hollinger, Mahwah; Robert A. Kovacs, West Orange, both of N.J.

[73] Assignee: AlliedSignal Inc., Morris Township, Morris County, N.J.

[21] Appl. No.: 346,797

[22] Filed: Nov. 30, 1994

[51] Int. Cl.[6] .................................................. G01C 19/72
[52] U.S. Cl. ............................................................. 356/350
[58] Field of Search ............................. 356/350; 385/12, 385/14; 250/227.19, 227.27

[56] References Cited

U.S. PATENT DOCUMENTS 5,268,740  12/1993  Gröllmann ............................. 356/350
5,351,123  9/1994  Spahlinger ............................. 356/350

Primary Examiner—Samuel A. Turner

[57] ABSTRACT

A system for tuning out an error signal in high performance fiber optic gyroscopes includes a compensation network having both active and passive filters which include the necessary pole and zero to cancel out the error signal. The entire system includes a fiber optic gyroscope connected to an amplifier, signal processor, square wave detector, modulator driver and the compensation network. The compensation network is connected between the modulator driver and the phase modulator of the fiber optic gyroscope.

20 Claims, 4 Drawing Sheets

TUNED INTEGRATED OPTIC MODULATOR ON A FIBER OPTIC GYROSCOPE

The U.S. Government has rights in this invention pursuant to contract number F33657-88-C-4280 awarded by the United States Government.

BACKGROUND OF THE INVENTION

1. Field of the Invention

The present invention relates to tuning of fiber optic gyroscope modulators and more specifically to tuning out a newly discovered imperfection in an integrated optic modulator.

2. Description of the Prior Art

Many different implementations of Fiber Optic Gyroscopes (FOGs) have been developed using integrated Optic Phase Modulators, typically of lithium niobate or other electro-optic materials. Three recent patents on this subject, assigned to the same assignee as the present invention, are U.S. Pat. Nos. 5,309,220, 5,280,339 and 5,278,631. All of the implementations described to date assume that the integrated optic modulator itself is a perfect device, with only a small shunt capacitance (a few picofarads) to distort the modulating signal. Integrated optic modulators used in FOG applications having a serrodyne feedback require a stable scale factor with flat frequency response. These devices typically have flat frequency responses over very wide bandwidths, far exceeding the requirements of most FOG applications. Analysis of the detected waveforms transmitted from the fiber optic gyro indicates that a very small frequency effect exists in the kilo hertz region, which can affect the scale factor and linearity of a FOG by very small amounts. This very subtle additional distortion is not measurable by normal means and is important only for high accuracy applications. This effect has been isolated to the integrated optic modulator and is not related to the external electronics.

SUMMARY OF THE INVENTION

The present invention provides a system for tuning out a newly discovered imperfection in integrated optic modulators which allows the elimination of an error source in high performance fiber optic gyroscopes. The integrated optic modulator has an internal pole and zero, which almost cancel each other at a frequency of a few kilohertz. The pole and zero are so close together that they are not detectable by ordinary means. The observed error effect can be compensated by an electronic network in the modulator drive electronics which has the opposite pole and zero (a lead-lag network). The network, a resistor capacitor combination, must be adjusted to achieve nearly complete cancellation of the observed error effect. Any network having the necessary pole and zero, including both active and passive filters, can be used to cancel this error effect.

DETAILED DESCRIPTION OF THE INVENTION

Figure 1:
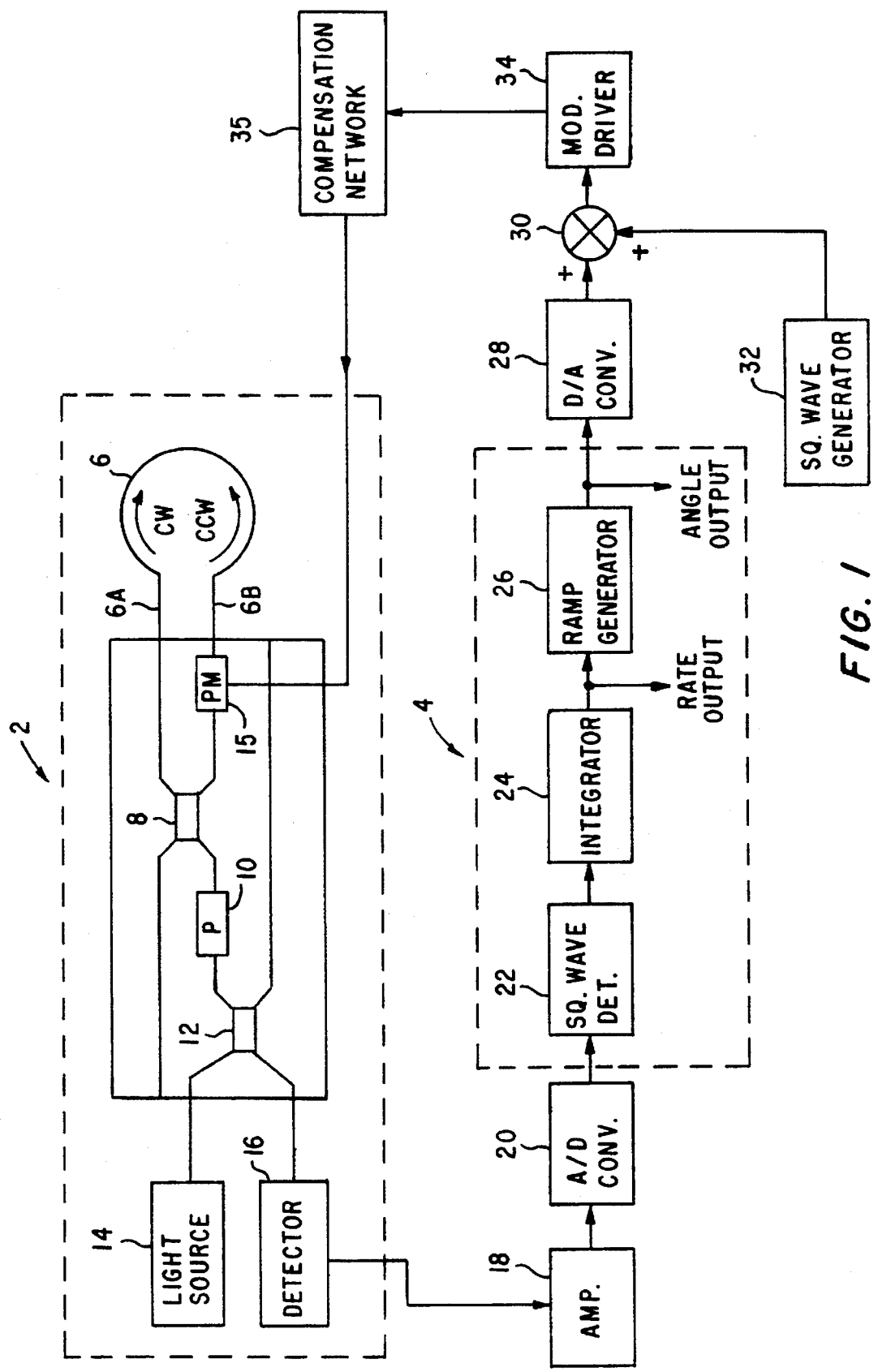
FIG. 1 illustrates a block diagram of a closed loop fiber optic gyroscope configured in accordance with the present invention.

FIG. 1 illustrates a minimum reciprocal fiber optic gyroscope as contemplated by the invention and designated by the numeral 2. Gyro 2 includes a fiber optic coil 6 having an end 6A coupled through a directional coupler 8, a polarizer 10 and a directional coupler 12 to a light source 14. Another end 6B of fiber optic coil 6 is coupled through a phase modulator 15, directional coupler 8, polarizer 10 and directional coupler 12 to a photo detector 16. The arrangement is such that a light beam from light source 14 is split into two beams. One of the two beams travels around coil 6 in a clockwise direction and the other beam travels around coil 6 in a counterclockwise direction. The phase shift between the clockwise and counterclockwise traveling beams is detected by detector 16 which provides a corresponding square wave analog electrical output. The output of detector 16 is passed through amplifier 18.

The amplified analog square wave output is applied to an analog to digital converter 20 which digitizes the square wave output, and therefrom to signal processing implementation 4, which is a digital implementation and includes a square wave detector 22, an integrator 24 and a ramp generator 26. Thus, the square wave digital output from A/D converter 20 is applied to square wave detector 22 and therefrom to integrator 24. The output from integrator 24 which corresponds to the rotational rate of gyro 2 is applied to ramp generator 26. The output of ramp generator 26 corresponds to the rotational angle of the gyro.

The output from ramp generator 26 is applied to a digital to analog converter 28, and the analog output therefrom is applied to summing means 30. The output from a square wave generator 32 is applied to summing means 30 and summed thereat with the analog output from D/A converter 28 to provide a summed output. Summing means 30 with its square wave generator input may be located between ramp generator 26 and D/A converter 28. The summed output is applied to modulator driver 34 which is connected to compensation network 35 utilized in the present invention. Compensation network 35, a resistor capacitor combination, achieves a nearly complete cancellation of the error effect discussed in the Background of the Invention. The output of compensation network 35 connects to phase modulator 15 to provide a closed loop gyro/signal processing configuration.

Gyro 2 acts as an optical interferometer with the desired optical phase shifts being in accordance with the Sagnac phase shift from a rotational rate imposed on coil 6 and phase shifts imposed by phase modulator 15. The Sagnac phase shift ($\Delta_\chi$) is expressed as:

$$\Delta\phi = (2\pi DL/\lambda C)\Omega$$

where ($\lambda$) is the wavelength of the light from light source 14, (D) and (L) are the diameter and length, respectively, of coil 6, and ($\Omega$) is the input rotation rate about the axis of coil 6 as seen by gyro 2.

Phase modulator 15 imposes phase shifts by virtue of a time delay (τ) for travel of the light beam from light source 14 through coil 6. Thus, for gyro 2, the light beam that travels counter-clockwise through coil 6 will reach phase modulator 15 (τ) seconds earlier than the clockwise traveling light beam. If phase modulator 15 changes state in those (τ) seconds, then the phase modulator has imposed a non-reciprocal phase shift between the clockwise and counter-clockwise light beams.

Figure 2:
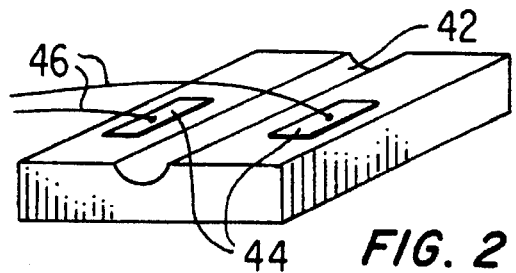
FIG. 2 illustrates an integrated optic phase modulator utilized in the present invention.

Compensation network 35 eliminates an error source affecting highly accurate fiber optic gyroscopes, in which a scale factor error of approximately 0.1%, and a linearity error of a few parts per million, can be eliminated. This error source is internal to an integrated optic modulator. As shown in FIG. 2, an integrated optic phase modulator 40 (15 of FIG. 1) consists of an optical waveguide 42 and electrodes 44 connected to wires 46. A voltage applied to electrodes 44 modifies the index of refraction and imparts a phase shift. The modulator is typically part of a larger structure, as shown in FIG. 1, containing other optical waveguide components such as Y-branches and polarizers and is typically fabricated in a slice of monocrystalline lithium niobate or lithium tantalate.

Figure 3:
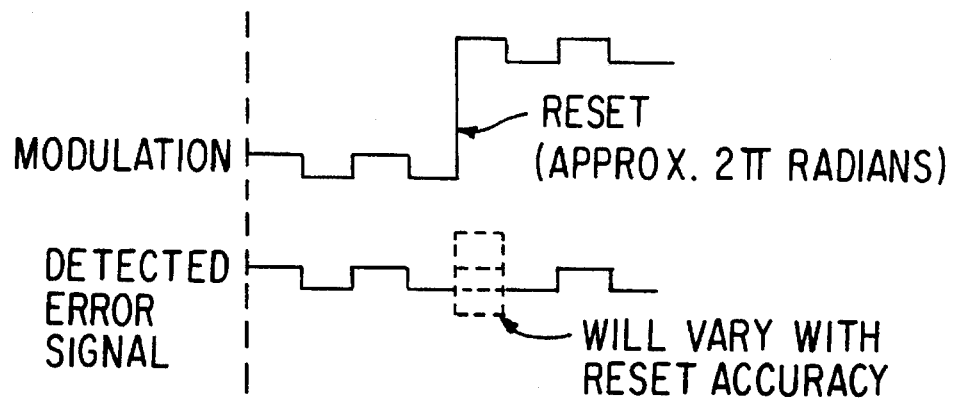
FIG. 3 illustrates the ideal detected error signal of the prior art.
Figure 4:
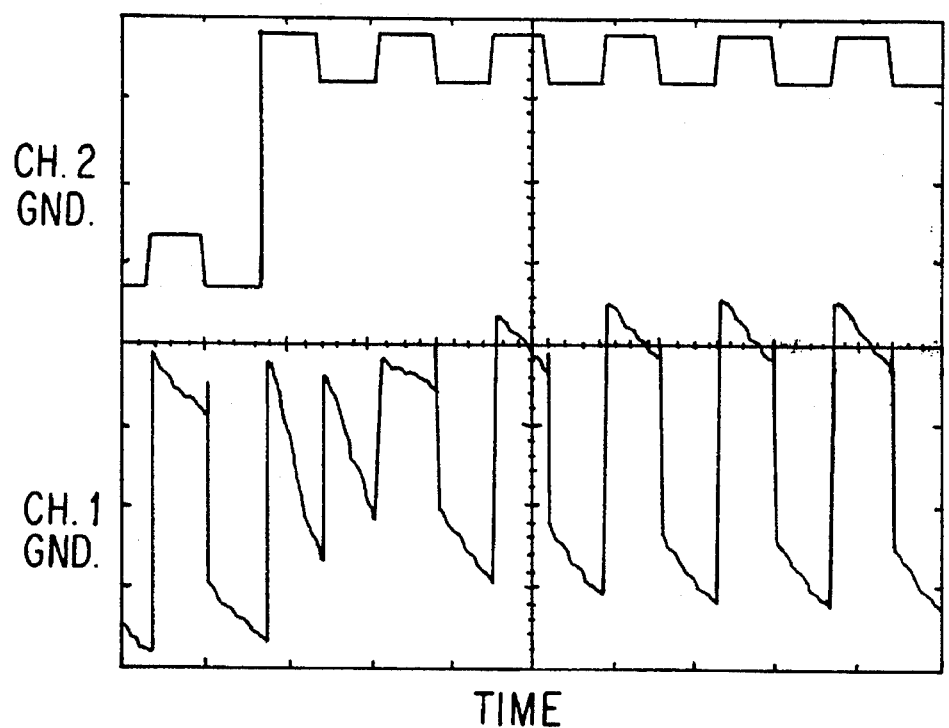
FIGS. 4 and 5 illustrate actual gyroscope signals without the compensation network of the present invention.
Figure 5:
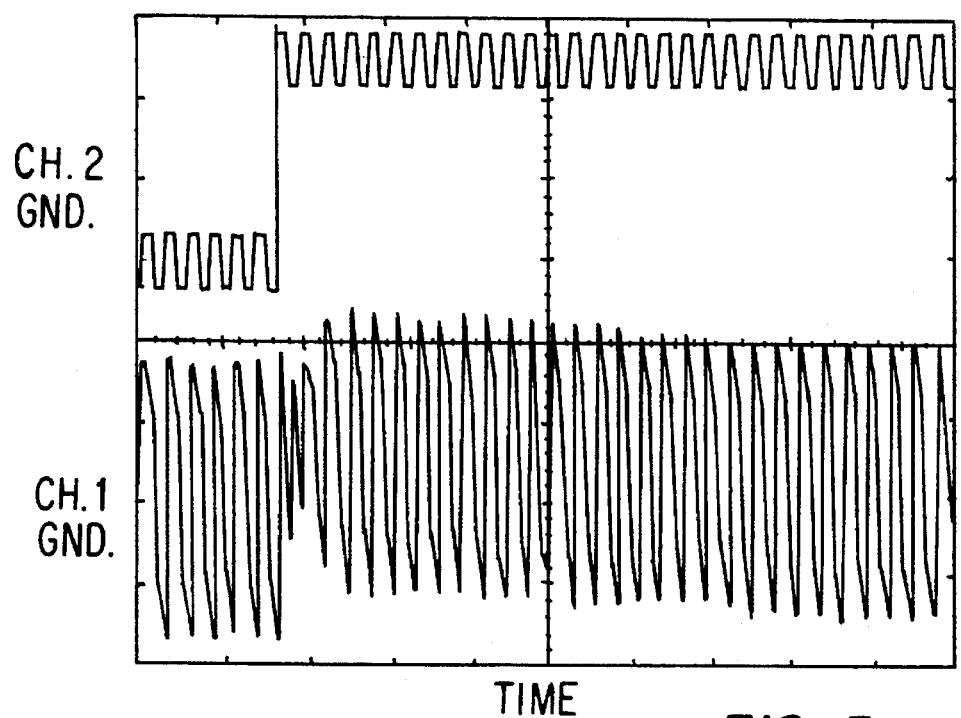

The error effect discussed in the Background of the Invention distorts the detected FOG error signal. As shown in FIG. 3, the ideal error signal looks like a square wave in synchronism with the modulation signal. The value or the error signal in the half cycle after the reset of the modulation waveform will vary according to the reset amplitude. An example of actual error signals is shown in FIG. 4 and FIG. 5. It can be seen that the error signal has been distorted significantly as follows: the square wave tops and bottoms have a very noticeable tilt, and additional distortion is seen for several cycles after the reset of the modulation waveform. This distortion in the error signal will cause errors in the FOG output.

The observed effect gives the appearance of a transfer function having a pole and a zero very close together, of the form $$\frac{T1S + 1}{T2S + 1}$$

which is similar to a lag-lead network. By utilizing simulation, it has been confirmed that a transfer function of this sort can generate the observed waveform and that it is possible to determine approximate values for T1 and T2. This analysis indicates that the time constants are in the neighborhood of 15 to 30 microseconds and the time constants are very close together (within approximately 0.1 percent of each other). Therefore the time constants are not readily detectable by normal means. It should be noted that this type of error effect has never been reported by the manufacturers of integrated optic modulators.

Figure 6:
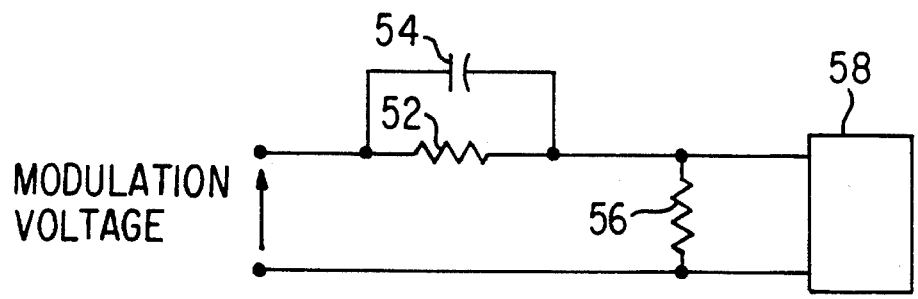
FIG. 6 illustrates a schematic of one embodiment of the present invention.
Figure 7:
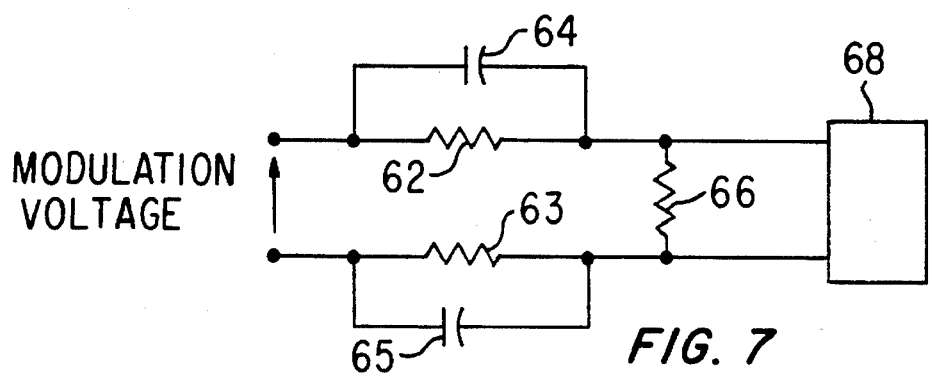
FIG. 7 illustrates a schematic of another embodiment of the invention.
Figure 8:
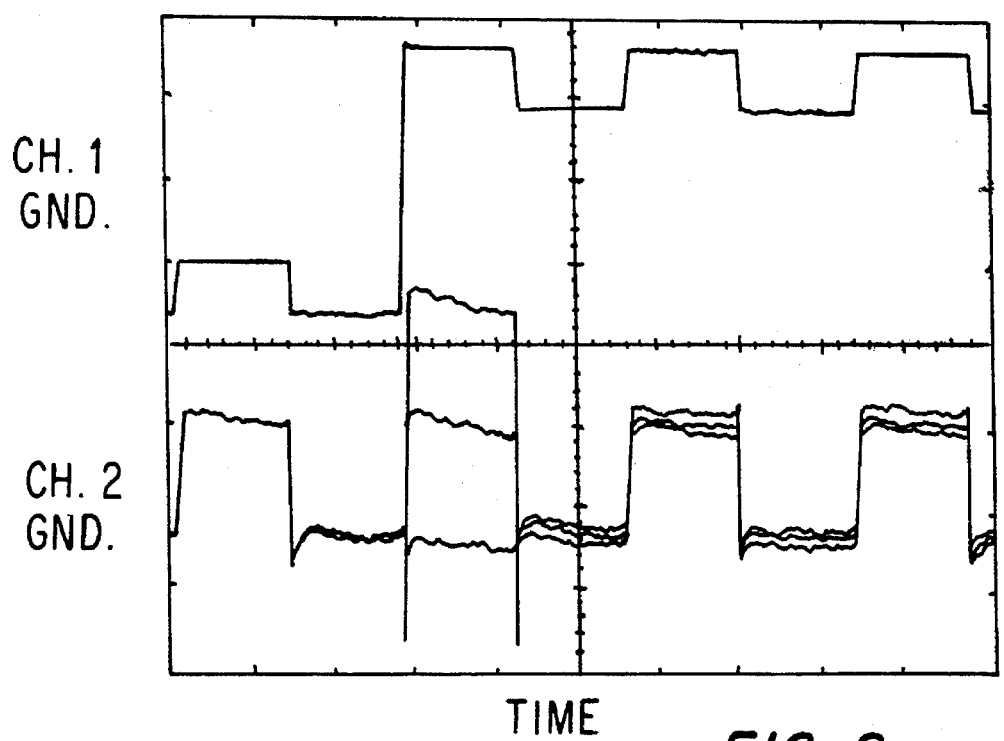
FIGS. 8 and 9 illustrate actual gyroscope signals with the compensation network of the present invention.
Figure 9:
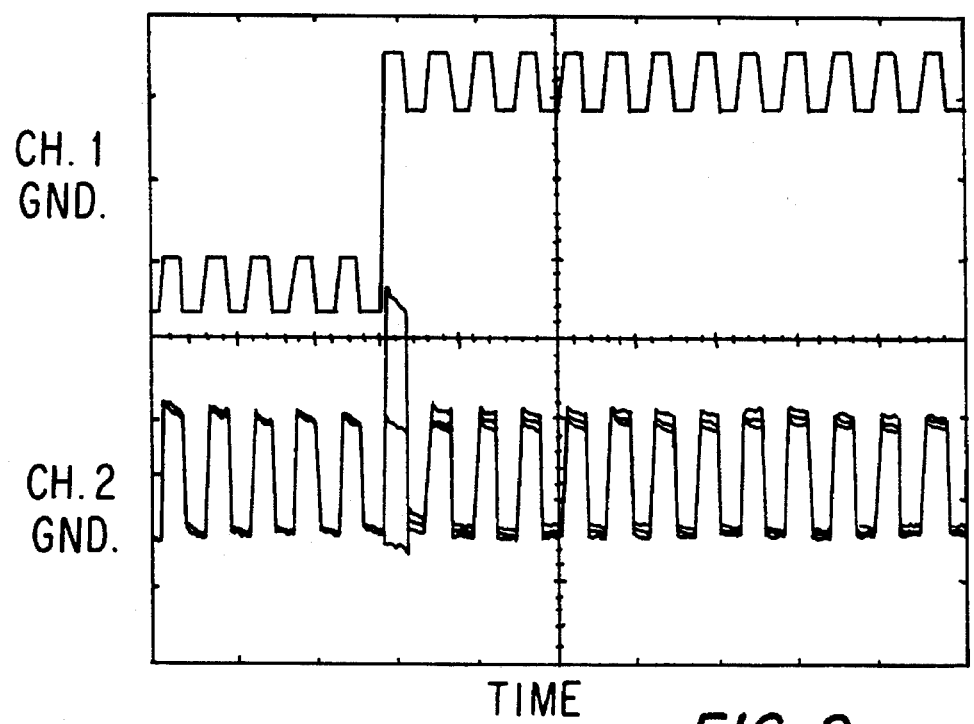

The observed error effect can be compensated by an electronic network in the modulator drive electronics which has the opposite pole and zero (a lead-lag network). The network shown in FIG. 6 will accomplish this purpose. In FIG. 6, Basic Compensation Circuit, modulation voltage is connected to resistor 52. Capacitor 54 is connected across resistor 52. Resistor 56 is connected to capacitor 54, resistor 52 and across integrated optic modulator 58. FIG. 7 illustrates a balanced compensation circuit. This has been implemented with a working gyro using a balanced twisted pair cable between the compensation network and the integrated optic modulator. In FIG. 7, modulation voltage is connected to resistors 62 and 63. Capacitors 64 and 65 are connected across resistors 62 and 63 respectively. Resistor 66 is connected between capacitors 64 and 65, resistors 62 and 63 and across integrated optic modulator 68. The network values can be adjusted to achieve nearly complete cancellation of the observed effects. The testing that has been performed served also to confirm that the interpretation of the observed effects was valid. The actual values in the compensation network to achieve this cancellation, indicate that the time constants internal to the integrated optic modulator are on the order of 20 microseconds and the actual time constants are only 0.1% apart. Any network, including both active and passive filters, having the necessary pole and zero, can be used to cancel the error effect. The FOG error signal observed after the cancellation network of the present invention was tuned is shown in FIGS. 8 and 9. It can be seen from FIGS. 8 and 9 that the distortions are removed.

The optimum component values for the tuning network of the present invention can be quickly determined using the procedure described below. Assuming the compensation network of FIG. 6, start with a value of resistor 52 which is excessively large. Adjust capacitor 54 to get a level slope on the detected square wave error signal. Then adjust resistor 56 to make the error signal on the second half cycle after the reset, and all subsequent cycles, to look exactly like the signal before the reset. (The half cycle immediately after the reset may be different, depending upon the accuracy of setting the reset value to 2-pi radians of optical phase shift). This method is successful because the value of capacitor 54 affects the slope of the error signal directly but the value of resistors 52 and 56 cancels in its effect on the slope, making it possible to adjust them independently. Due to small interactions, it may be necessary to repeat the above operation for both the capacitor and the resistors to fine tune it, especially if the modulation frequency is within an order of magnitude of the pole and zero being compensated.

Implementation of the present invention was performed using lithium niobate modulators, however, similar effects probably occur in other materials as well, and the methods described herein are equally applicable in those materials. The present invention pertains primarily to interferometric FOGs with serrodyne feedback, although the compensation method can be used with any application of integrated optic modulators where the error terms discussed above are important.

It is not intended that this invention be limited to the hardware or operational procedures shown disclosed. This invention includes all of the alterations and variations thereto as encompassed within the scope of the claims as follows.

What is claimed:

1. A tuned integrated optic modulator on a fiber optic gyroscope comprising:

a fiber optic gyroscope;

an amplifier connected to said fiber optic gyroscope;

an analog to digital converter connected to said amplifier;

a signal processor connected to said analog to digital converter;

a digital to analog converter connected to said signal processor;

a mixer connected to said digital to analog converter;

a square wave generator connected to said mixer;

a modulator driver connected to said mixer; and, a compensation network connected between said modulator driver and said fiber optic gyroscope.

2. A tuned integrated optic modulator on a fiber optic gyroscope as claimed in claim 1 wherein said fiber optic gyroscope comprises:

a light source;

a first directional coupler connected to said light source;

a polarizer connected to said first directional coupler;

a second directional coupler connected to said polarizer;

a fiber optic coil connected to said second directional coupler;

a phase modulator connected between said second directional-coupler and said fiber optic coil and also connected to said compensation network; and, a detector connected to said first directional coupler.

3. A tuned integrated optic modulator on a fiber optic gyroscope as claimed in claim 1 wherein said signal processor comprises:

a square wave detector connected to said analog to digital converter;

an integrator connected to said square wave detector; and, a ramp generator connected to said integrator.

4. A tuned integrated optic modulator on a fiber optic gyroscope as claimed in claim 3 wherein:

said integrator provides a rate output.

5. A tuned integrated optic modulator on a fiber optic gyroscope as claimed in claim 4 wherein:

said ramp generator provides an angle output.

6. A tuned integrated optic modulator on a fiber optic gyroscope as claimed in claim 1 wherein:

said compensation network eliminates an error signal affecting performance of said fiber optic gyroscope.

7. A tuned integrated optic modulator on a fiber optic gyroscope as claimed in claim 6 wherein said compensation network comprises:

a resistor capacitor network adjusted to cancel said error signal.

8. A tuned integrated optic modulator on a fiber optic gyroscope as claimed in claim 6 wherein said compensation network comprises:

a first resistor connected to modulation voltage;

a capacitor connected across said first resistor; and, a second resistor connected between said capacitor and said modulator driver.

9. A tuned integrated optic modulator on a fiber optic gyroscope as claimed in claim 8 wherein values of said first resistor, said capacitor and said second resistor are adjusted to cancel said error signal.

10. A tuned integrated optic modulator on a fiber optic gyroscope as claimed in claim 6 wherein said compensation network comprises:

a first resistor connected to a positive modulation voltage;

a first capacitor connected across said first resistor;

a second resistor connected to a negative modulation voltage;

a second capacitor connected across said second resistor; and, a third resistor connected between said first resistor and said second resistor and connected to said modulator driver.

11. A tuned integrated optic modulator on a fiber optic gyroscope as claimed in claim 10 wherein values of said first resistor, said first capacitor, said second resistor, said second capacitor and said third resistor are adjusted to cancel said error signal.

12. A tuned integrated optic modulator on a fiber optic gyroscope as claimed in claim 6 wherein said compensation network comprises:

any network comprising both active and passive filters having necessary pole and zero to cancel said error signal.

13. A tuned integrated optic modulator on a fiber optic gyroscope comprising:

fiber optic gyroscope means;

amplifier means connected to said fiber optic gyroscope means;

analog to digital converter means connected to said amplifier means;

signal processor means connected to said analog to digital converter means;

digital to analog converter means connected to said signal processor means;

mixer means connected to said digital to analog converter means;

square wave generator means connected to said mixer means;

modulator driver means connected to said mixer; means and, compensation network means connected between said modulator driver means and said fiber optic gyroscope means.

14. A tuned integrated optic modulator on a fiber optic gyroscope as claimed in claim 13 wherein said signal processor means comprises:

square wave detector means connected to said analog to digital converter means;

integrator means connected to said square wave detector means; and, ramp generator means connected to said integrator means.

15. A tuned integrated optic modulator on a fiber optic gyroscope as claimed in claim 13 wherein said compensation network means comprises:

both active and passive filters having a necessary pole and zero to eliminate an error signal affecting performance of said fiber optic gyroscope means.

16. A tuned integrated optic modulator on a fiber optic gyroscope as claimed in claim 13 wherein said compensation network means comprises:

resistor capacitor network means adjusted to cancel said error signal.

17. A tuned integrated optic modulator on a fiber optic gyroscope as claimed in claim 13 wherein said compensation network means comprises:

first resistor means connected to modulation voltage;

capacitor means connected across said first resistor means; and, second resistor means connected between said capacitor means and said modulator driver means.

18. A tuned integrated optic modulator on a fiber optic gyroscope as claimed in claim 13 wherein said compensation network means comprises:

first resistor means connected to a positive modulation voltage;

first capacitor means connected across said first resistor means;

second resistor means connected to a negative modulation voltage;

second capacitor means connected across said second resistor means; and, third resistor means connected between said first resistor means and said second resistor means and connected to said modulator driver means.

19. A tuned integrated optic modulator on a fiber optic gyroscope comprising:

a fiber optic gyroscope;

an amplifier connected to said fiber optic gyroscope;

an analog to digital converter connected to said amplifier;

a signal processor connected to said analog to digital converter;

a mixer connected to said signal processor;

a square wave generator connected to said mixer;

a digital to analog converter connected to said mixer;

a modulator driver connected to said digital to analog converter; and, a compensation network connected between said modulator driver and said fiber optic gyroscope, wherein said compensation network comprises:

both active and passive filters having a necessary pole and zero to eliminate an error signal affecting performance of said fiber optic gyroscope.

20. A tuned integrated optic modulator on a fiber optic gyroscope as claimed in claim 19 wherein said compensation network comprises:

both active and passive filters having a necessary pole and zero to eliminate an error signal affecting performance of said fiber optic gyroscope.

* * * * *